UNITED STATES PATENT OFFICE.

WALDEMAR WERNICH, OF MILWAUKEE, WISCONSIN.

COMPOSITION FOOD FOR CATTLE, HORSES, AND SWINE.

SPECIFICATION forming part of Letters Patent No. 385,220, dated June 26, 1888.

Application filed August 30, 1887. Serial No. 248,270. (No specimens.)

*To all whom it may concern:*

Be it known that I, WALDEMAR WERNICH, of Milwaukee, in the county of Milwaukee, and in the State of Wisconsin, have invented certain new and useful Improvements in Composition Food for Cattle, Horses, and Swine; and I do hereby declare that the following is a full, clear, and exact description thereof.

My invention relates to the production of a composition food for cattle, horses, and swine from the refuse swill of distilleries; and it consists in the addition of certain ingredients thereto in a particular manner, as hereinafter set forth and claimed.

To produce about a ton of the prepared food, take twelve hundred pounds of the refuse distillery-swill and add thereto two hundred pounds of hard-wood sawdust, (previously comminuted by the addition thereto of two and a half pounds of sulphuric acid,) forty pounds of ground linseed, sixty pounds of common salt, and five hundred pounds of rye-flour. These ingredients are thoroughly mixed together, and the resulting mass is put into wooden molds (preferably each a foot long, eight inches wide, and three inches high) and pressed into loaves after the manner of pressing clay into bricks, but without the loss of any appreciable quantity of the liquid material, and then these loaves are rolled in rye-flour, put upon straw paper laid on a board, and put into an oven and baked. The paper does not burn and adheres to the bottom of the loaves, and is trimmed off, so as to form the base of the said loaves.

For horses the loaves are simply cut into pieces; but for cattle and swine they are preferably mixed with water, forming a porridge-like drink.

Having thus fully described my invention, what I claim as new, and desire to secure by Letters Patent, is—

A composition food for cattle, horses, and swine, consisting of a mixture of refuse distillery-swill, sawdust, ground linseed, salt, and rye-flour, in practically the proportions hereinbefore named, baked into loaves, substantially as set forth.

In testimony that I claim the foregoing I have hereunto set my hand, at Milwaukee, in the county of Milwaukee and State of Wisconsin, in the presence of two witnesses.

WALDEMAR WERNICH.

Witnesses:
   H. G. UNDERWOOD,
   J. KAUMHEIMER.